United States Patent
Dougherty

(10) Patent No.: US 6,485,188 B1
(45) Date of Patent: Nov. 26, 2002

(54) WHEEL MOUNTING WITH A BEARING RACE EMBEDDED IN A CAST COMPONENT

(75) Inventor: John D. Dougherty, Stark County, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 09/558,139

(22) Filed: Apr. 21, 2000

(51) Int. Cl.$^7$ ................................ F16C 35/00
(52) U.S. Cl. .................... 384/589; 384/544; 384/537; 384/584; 301/105.1
(58) Field of Search ................ 384/544, 589, 384/537, 585, 584; 301/125, 137, 105.1, 124.1, 126, 131; 180/252, 258, 259; 464/178, 901, 906; 403/259, 261

(56) References Cited

U.S. PATENT DOCUMENTS

| | | | |
|---|---|---|---|
| 845,632 A | | 2/1907 | Gurney |
| 2,370,173 A | | 2/1945 | Kendall |
| 3,451,736 A | * | 6/1969 | Riccio ............... 308/236 |
| 3,693,226 A | | 9/1972 | Howe, Jr. |
| 3,714,694 A | | 2/1973 | Dobson |
| 3,998,505 A | | 12/1976 | Frost et al. |
| 4,784,500 A | * | 11/1988 | Prokop ............... 384/462 |
| 4,880,281 A | * | 11/1989 | Merkelbach ........ 301/124 R |
| 4,944,611 A | | 7/1990 | Ankenbauer et al. |
| 5,022,659 A | | 6/1991 | Otto |
| 5,085,519 A | | 2/1992 | Dougherty |
| 5,112,146 A | | 5/1992 | Strangeland |
| 5,454,647 A | | 10/1995 | Otto |
| 5,553,870 A | | 9/1996 | Czekansky et al. |
| 5,716,147 A | | 2/1998 | Cook et al. |
| 5,740,895 A | | 4/1998 | Bigley |
| 6,170,919 B1 | * | 1/2001 | Hofmann et al. ........ 301/105.1 |

FOREIGN PATENT DOCUMENTS

| | | |
|---|---|---|
| EP | 0849097 A2 | 6/1998 |
| EP | 0849097 A3 | 6/1998 |
| FR | 2755195 A1 | 10/1996 |
| FR | 2794671 A1 | 10/1999 |
| GB | 1520341 | 1/1976 |
| WO | WO9858762 | 12/1998 |

* cited by examiner

Primary Examiner—David A. Bucci
Assistant Examiner—Timothy McAnulty
(74) Attorney, Agent, or Firm—Polster, Lieder, Woodruff & Lucchesi, L.C.

(57) ABSTRACT

A mounting for the road wheel of a vehicle includes a hub, a suspension system component, which may be a steering knuckle, and an antifriction bearing located between the hub and the suspension system component to enable the hub to rotate within the component. The wheel is bolted to the hub, whereas the suspension system component is attached to the frame or unified body of the vehicle. The bearing has an outer race in the form of an insert that is embedded with the suspension system component. That insert is formed from a bearing grade steel, whereas suspension system component is formed by casting a different metal around the insert. The insert may also be within a hub that rotates on an axle.

21 Claims, 4 Drawing Sheets

WHEEL MOUNTING WITH A BEARING RACE EMBEDDED IN A CAST COMPONENT

BACKGROUND OF THE INVENTION

This invention relates in general to mountings for the road wheels of an automotive vehicles and, more particularly, to mountings in which a bearing race is embedded in an adjacent component.

The front wheels of an automotive vehicle must rotate about horizontal axes, and must also pivot about near vertical axes, the latter in order to steer the vehicle. To this end, the typical front wheel rotates on an antifriction bearing which is in turn fitted to a steering knuckle that forms part of the suspension system for the vehicle. The knuckle pivots about a near vertical axis on ball-and-socket joints.

In one arrangement, which finds widespread use in four wheel drive vehicles, the road wheel is bolted to a hub having a spindle which projects into the antifriction bearing. Indeed, the inner races of the bearing fit over the spindle (FIG. 1). The outer race, on the other hand, possesses a flange through which the bolts pass to secure it to the steering knuckle. Rolling elements fit between the inner and outer races where they run along raceways which are angulated to transfer both radial and thrust loads. The torque for driving the front wheels is transferred to the spindle on the hub through a constant velocity (CV) joint. Compared to the outer race of the bearing, the steering knuckle possesses considerable mass. It is usually formed from cast iron or cast steel. On the other hand, the bearing, including its flanged outer race, is formed from bearing quality steel which is considerably more expensive.

By reason of its flange, the outer race is larger than the outer races of more conventional bearings having the same load-carrying capacity. This requires a greater amount of bearing steel and machining. Indeed, the flange must undergo facing and the holes for the bolts need to be drilled. The steering knuckle, on the other hand, requires a machined bore to receive the outer race, and a machined face to accommodate the flange. Apart from that, it requires tapped holes for the bolts. Where the outer race has a flange, bolts which pass through the flange and thread into the knuckle serve this purpose.

Thus, the typical mounting for a front wheel at the location where the bearing is fitted to the steering knuckle possesses several parts and requires multiple machining operations. These are reflected in the cost of manufacturing the bearing and knuckle and in the expense of assembling it.

In other types of wheel mountings, the inner races remain stationary on a spindle or axle end and the outer races rotate with a hub to which the road wheel is attached. Typically, the hub has machined counter bores into which the outer races are fitted. Again the machinery requires time and expense.

SUMMARY OF THE INVENTION

The present invention resides in mounting for a road wheel of a vehicle which mounting includes two members, one of which is a hub to which a road wheel is attached and the other a suspension system component. It also includes an antifriction bearing, one race of which is embedded in one of the members as an insert. The invention further resides in a hub provided with a spindle and a suspension system component which fits around the spindle, it being formed as a metal casting. The hub rotates on a bearing including an inner race located around the spindle; an outer race embedded as an insert in the cast suspension system component, and rolling elements located between the two races. The invention also resides in the suspension system component formed as a steering knuckle with the outer race of the bearing being embedded in it as an insert.

DETAILED DESCRIPTION

Figure 1:
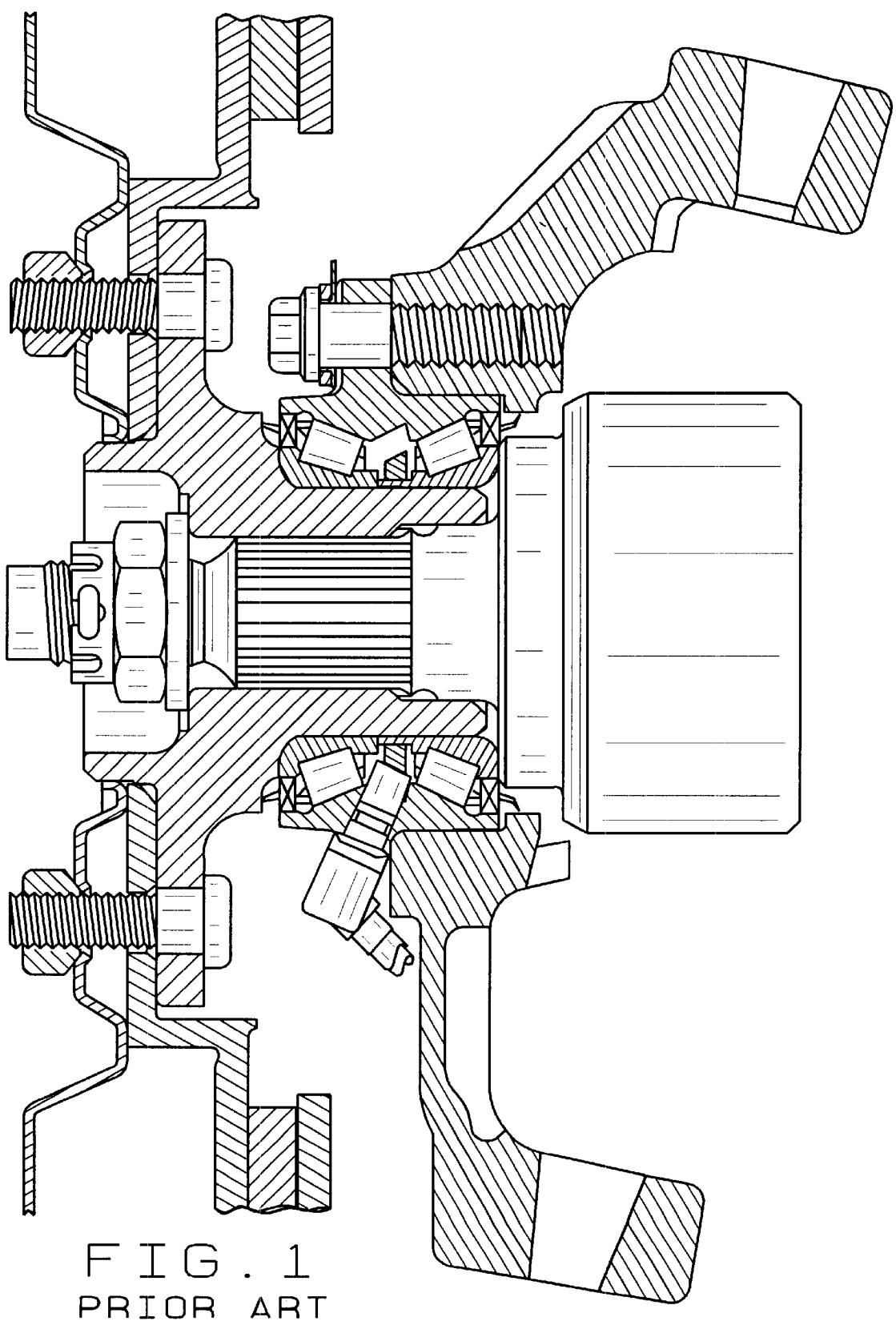
FIG. 1 is an axial sectional view of a wheel mounting of the prior art with the bearing of the mounting having an outer race that is bolted to a steering knuckle and does not rotate.
Figure 2:
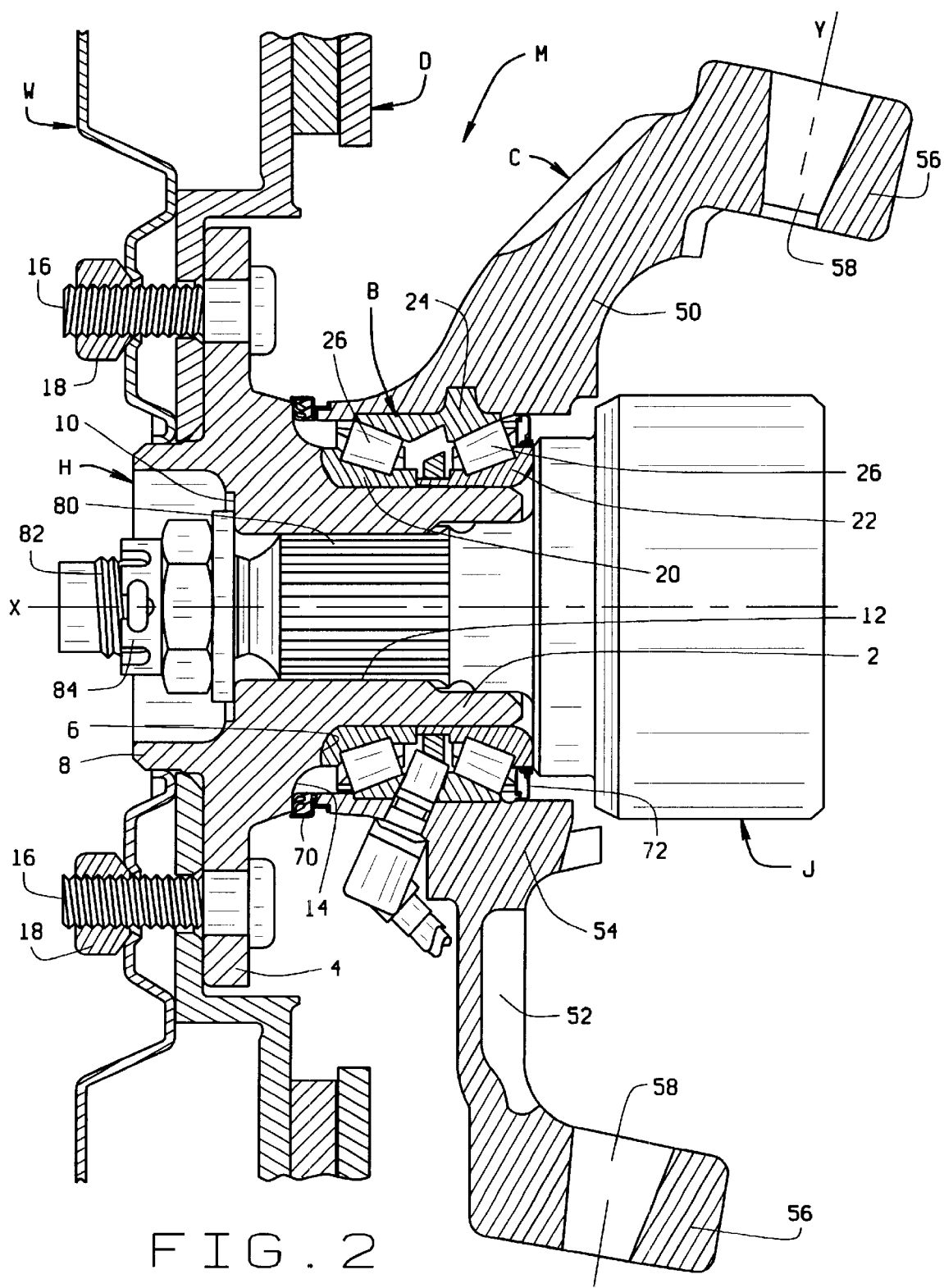
FIG. 2 is an axial sectional view of a wheel mounting constructed in accordance with and embodying the present invention the outer race of its bearing being embedded in the steering knuckle as a cast insert.

Referring now to the drawings (FIG. 2), a mounting M for coupling a road wheel W to the frame or unified body of an automotive vehicle includes a hub H to which the road wheel is attached along with a brake disk D, a suspension system component C which is connected to the frame or unified body of the vehicle such that it can shift relative to the frame or body, usually under the influence of a suspension spring, and an antifriction bearing B which is fitted between the hub H and the suspension system component C, enabling the hub H and wheel W to rotate relative to that component C about a generally horizontal axis X. But the bearing B prevents the hub H and wheel W from otherwise being displaced. The suspension system component C typically takes the form of a steering knuckle which rotates about a near vertical axis Y. The hub H may be connected to a CV joint J which is driven by a drive shaft, so as to transfer torque to the hub H and thence to the wheel W.

The hub H includes (FIG. 2) a spindle 2 and a flange 4 which projects from the spindle 2 at a shoulder 6 located along the inboard face of the flange 4. On its opposite face the hub H has a circular rib 8 which surrounds a machined clamping surface 10. The spindle 2 contains a splined bore 12 which at one end opens out of the clamping surface 10 and at its other out of the free end of the spindle 2. Outwardly from the shoulder 6, the flange 4 has a sealing surface 14 which faces inwardly as does the shoulder 6. Beyond the sealing surface 14, the flange 4 is fitted with lug bolts 16 which project axially from its outboard face, forming a bolt circle around the circular rib 8. The brake disk D fits against the flange 4 and the road wheel W against the disk D, with the lug bolts 16 projecting through each of them. Beyond the wheel W, lug nuts 18 are threaded over the bolts 16 to secure the disk D and wheel W to the hub H.

The bearing B includes (FIG. 2) an inner race in the form of two cones 20 and 22 which fit around the spindle 2 with interference fits, an outer race in the form of an insert 24 that is embedded within the suspension system component C, and rolling elements in the form of tapered rollers 26 arranged in two rows between the cones 20 and 22 and the insert 24. The cones 20, 22, the insert 24, and the rollers 26 are all formed from a suitable bearing steel.

Each cone 20 and 22 has (FIG. 3) a tapered raceway 32, that is presented outwardly away from the axis X, a thrust rib 34 at the large end of its raceway 32, and a back face 36, which is squared off with respect to the axis X on the end of the thrust rib 34. The inboard cone 22 is somewhat longer than the outboard cone 20 by reason of a cylindrical cone extension 38 which projects beyond the small end of its raceway 32. The cone extension 38 may serve as a seat for a target wheel that is monitored by a speed sensor. The inboard cone 22 at its cone extension 38 abuts the small end of the outboard cone 20 along the spindle 2, that is to say, the two cones 20 and 22 abut at their front faces. The back face 36.of the outboard cone 20 abuts the shoulder 6 that lies along the flange 4. The back face 36 of the inboard cone 22 lies beyond the free end of the spindle 2.

Figure 3:
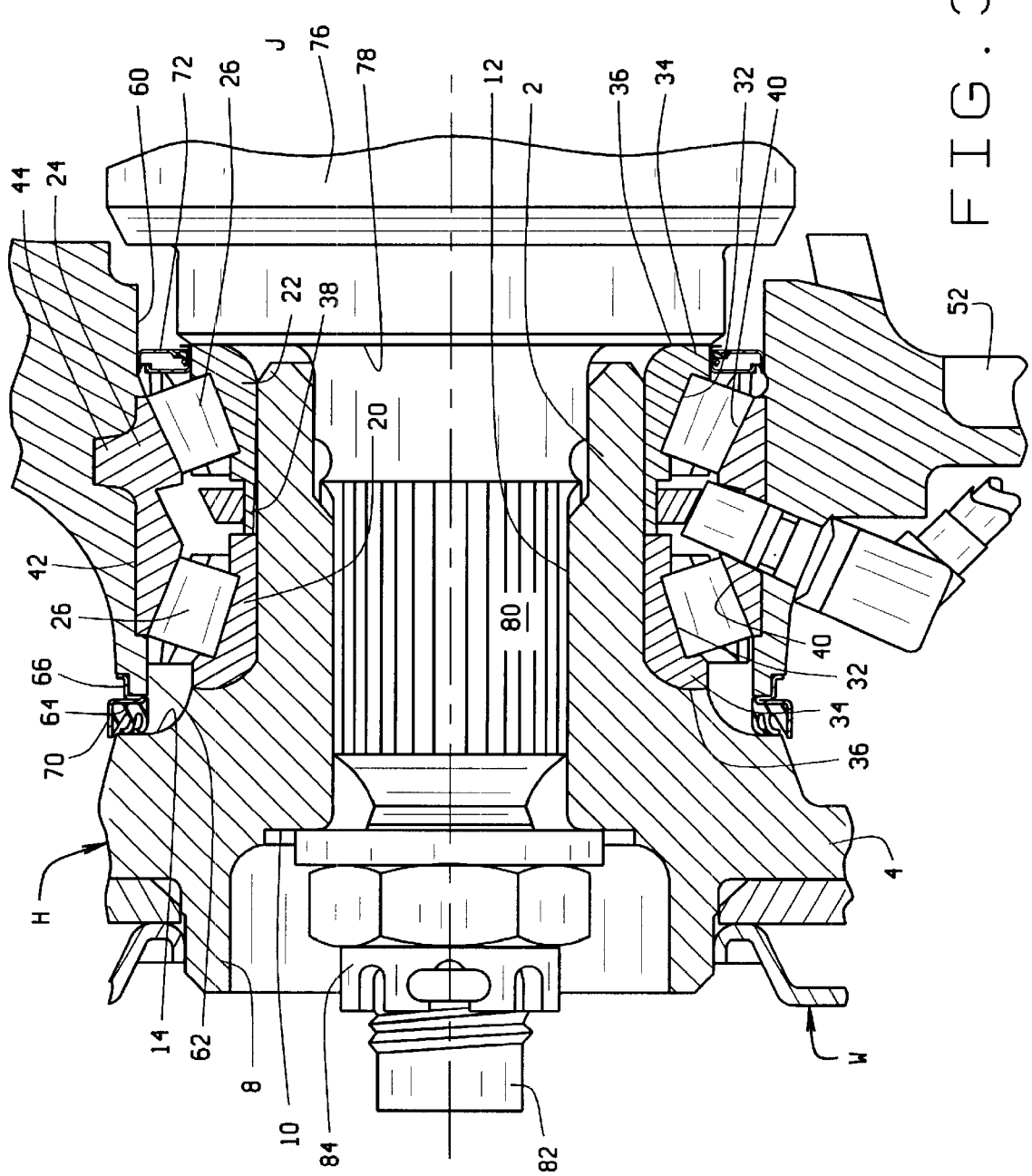
FIG. 3 is an enlarged fragmentary sectional view of the wheel mounting of FIG. 2.

The tapered rollers 26 are arranged in two rows, there being a separate row around each cone 20 and 22 (FIG. 3). Actually, the rollers 26 extend around the raceways 32 for the cones 20 and 22, there being essentially line contact between the tapered side faces of the rollers 26 and the raceways 32. The large end faces of the rollers 26 bear against the thrust ribs 34 and, indeed, the thrust ribs 34 prevent the rollers 26 from moving up the raceways 32 and out of the bearing B. The rollers 26 of each row are essentially on apex, which means that the envelopes in which their tapered side faces lie have their apices located at a common point along the axis X. Each row of rollers 26 has a cage to maintain the proper spacing between the rollers 26 in that row.

The insert 24 surrounds the spindle 2 as well as the two cones 20 and 22 and the two rows of rollers 26 (FIG. 3). It has tapered raceways 40 which are presented inwardly toward the axis X and taper downwardly toward an intervening surface which separates them. The rollers 26 likewise lie along the raceways 40 of the insert 24, there being essentially line contact between the raceways 40 and the tapered side faces of the rollers 26. At their large ends, the raceways 40 open out of the ends of the insert 24, and these ends lie generally within the space bounded by the thrust ribs 34 of the two cones 20 and 22.

The insert 24 on its exterior has a surrounding surface 42 which extends out to the two ends of the insert and also a protrusion 44 which projects outwardly beyond the surrounding surface 42, it being offset closer to the inboard end of the insert 24 than the outboard end. The surrounding surface 42 may be cylindrical, or slightly tapered inwardly away from the protrusion, with the taper being on the order of 3° to 7°. The protrusion may be segmented or continuous, but when continuous, its outwardly presented surface should be polygonal or otherwise noncircular.

The insert 24 is formed from a bearing quality steel that has the capacity of acquiring a hard case through induction hardening. 1060 steel meets these qualifications. The insert 24 initially exists as a separate component, it acquiring its basic shape through hot forging or by ring rolling. When hot forged, the surrounding surface 42 has the slight tapers.

The suspension system component C, when in the form of a steering knuckle, includes (FIG. 2) an upper arm 50 and a lower arm 52 which meet at an enlarged intermediate portion 54 in which the insert 24 of the bearing B is embedded. Both arms 50 and 52 are offset toward the inboard end of the intermediate portion 54, thus leaving the outboard end of the intermediate portion 54 resembling a collar. The upper arm 50 projects obliquely inwardly well beyond the inboard end of the intermediate portion 54, whereas the lower arm 52 extends directly downwardly. Each arm 50 and 52 has a laterally directed end 56 that projects inwardly and contains a tapered socket 58 designed to receive the tapered stem on a conventional ball-and-socket joint. The intermediate portion 54 contains (FIG. 3) a machined bore 60 that leads from the inboard end of the insert 24 to the inboard end face of the intermediate portion out of which it opens between the two arms 50 and 52. The intermediate portion has another bore 62 that leads away from the outboard end of the insert 24 and opens toward the sealing surface 14 on the flange 4 of the hub H. Here the intermediate portion 54 has a machined end face 64 and a machined exterior surface 66 which extends over the collar-like end of the intermediate portion 54 and leads away from the end face 64. The exterior surface 66 is quite short and cylindrical. In addition, the suspension system component, when in the form of a steering knuckle, has another arm (not shown) which attaches to a tie rod end of the steering system and a bracket (not shown) to which attaches a brake caliper that operates against the brake disk D.

The suspension system component C is formed in a casting operation from a suitable metal such ductile iron or steel, although other metals such as aluminum will suffice as well. In any event, the metal for the component C is different from the high quality bearing steel of the insert 24 and is cast around the insert 24 which becomes embedded in the component C. Owing to the presence of protrusion 44 on the insert 24 and the mechanical interlock develops between the insert 24 and the cast metal of the component C, and that interlock prevents the insert 24 from undergoing any axial displacement in the intermediate portion 54. On the other hand, the segmented configuration of the protrusion 44 or its polygonal outwardly presented surface prevent the insert 24 from rotating in the intermediate portion 54. While the surrounding surface 42 and the surfaces of the protrusion 44 should be clean prior to casting, they need not be cleaned to the extent that they will effect a diffusion bond with the cast metal of the component C.

Once the component C is cast, the laterally directed ends 56 on its arms 50 and 52 are provided with the tapered sockets 58 in a machining operation. Also, the outboard bore 60 of the intermediate portion 54 is machined, as are the end face 64 and exterior surface 66 at the outboard end of the intermediate portion 54.

Lastly, the insert 24 itself is machined (green machined) along its tapered raceway 40. Next the insert 24 is induction hardened only along its raceways 40.

Finally, the insert 24 is finish machined along its raceways 40 to provide those raceways with an acceptable finish and to bring them within established tolerances.

The interior of the bearing B is isolated with seals 70 and 72 (FIGS. 2 & 3) which are fitted to the intermediate portion 54 of the component C. The outboard seal 70 fits over the machined exterior surface 66 at the outboard end of the intermediate portion 54 and establishes a dynamic fluid barrier with the sealing surface 14 on the flange 4 of the hub H. U.S. Pat. No. 5454647 discloses a seal suitable for use at this location. The inboard seal 72 establishes a dynamic fluid barrier between the machined inboard bore 60 on the intermediate portion 54 of the component C and the thrust rib 34 of the inboard cone 20. U.S. Pat. No. 5022659 discloses a seal suitable for this location. The seals 70 and 72 exclude contaminants from the interior of the bearing B, that is from the space occupied by the two rows of rollers 26, and further retain grease in that space.

The CV joint J, which lies at the end of a drive shaft, has an enlarged body 76 provided with a shoulder 78 presented toward the bearing B. It also has a stub shaft 80 which projects beyond the shoulder 78 and is provided with a spline. The very end of the stub shaft 80 is reduced in diameter and threaded to provide a threaded end 82. The stub shaft 80 fits into the bore 12 of the spindle 2 for the hub H, where its spline engages the spline in the bore 12. The shoulder 78 bears against the back face 36 of the inboard cone 22. The threaded end 82 of the stub shaft 80 projects axially beyond the clamping surface 10 that lies within the circular rib 8 on the hub H. Here the stub shaft 80 is engaged with a nut 84. When the nut 84 is tightened, it in effect bears against the clamping surface 10 of the hub. H and forces the shoulder 78 of the CV joint J against the back face 36 of the inboard cone 22. This clamps the two cones 20 and 22 snugly together between the shoulder 6 on the hub H and the shoulder 78 on the body 76 of the CV joint J. In the alternative, the end of the spindle 2 on, the hub H may be extended axially beyond the back face 36 of the inboard cone, and there deformed radially outwardly as disclosed in International Patent Application PCT/GB98/01823 (published under No. WO98/58762).

But the mounting M has utility with nondriven wheels W as well. With nondriven wheels W the CV joint J is absent and the two cones 20 and 22 are clamped together by defoming the end of the spindle 2 against the back face 36 of the cone 22 as disclosed in International Application PCT/GB98/01823. Or the spindle 2 may be extended beyond the back face 36 of the inboard cone 22 and threaded, so that a nut may be engaged with the threads and turned down against the back face 36 to clamp the two cones 20 and 22 on the spindle 2.

Compared with more conventional wheel mountings in which the outer race of the bearing is bolted to the suspension system component, the mounting M possesses several advantages. First, it has less components, and requires no bolts to attach the bearing B to suspension system component C. Secondly, it is less costly to manufacture, with much of the savings deriving from the absence of bolt hole drilling and tapping as well as machining to conform mating surfaces. In addition, the component C with its embedded insert 24 weighs less than a traditional corresponding component with an outer bearing race bolted to it. The component C also has a reduced axial section which enables the overall mounting M to have a reduced axial width. This permits the wheel load line location to be moved inboard, resulting in a lesser scrub radius and greater vehicle stability. Apart from the reduced axial section, the component C has a reduced radial section as well, and this affords more room for the braking system, so that disk brakes may have a larger swept area.

While the steering component C illustrated and described takes the form of a steering knuckle and thus pivots about a near vertical axis, it may with modification serve as a mount for a rear wheel, either driven or nondriven. Also, the bearing B need not be a tapered roller bearing. Instead, it may be a double row angular contact ball bearing or a spherical roller bearing.

In a modified mounting N a member N in the form of a hub R rotates about another member in the form of an axle S, with the rotation being accommodated by an antifriction bearing T. The road wheel W is attached to the hub R along with a brake driven U. The bearing T, which establishes an axis X of rotation, fits over the axle S and is embedded within the hub R. The axle S constitutes a suspension system component.

More specifically, the axle S has at its end a cylindrical bearing seat 100 which leads from a shoulder 102 out to a threaded end 104. The axle S may be hollow so as to accommodate a drive shaft 106 which projects out of it and there is provided with drive flange 108.

The hub R encircles the bearing T and the axle S at its bearing seat 100 and is provided with a flange 110 which projects radially outwardly intermediate its ends. The flange 110 carries lug bolts 112 which project axially from it and pass through the brake drum U and road wheel W. The brake drum U and road wheel W are secured against the flange 110 with nuts 114 which thread over the lug bolts 112. The drive flange 108 on the end of the drive shaft 106 is secured to the hub R with machine screws 116 which pass through the flange 108 and thread into the hub R. Thus, torque applied to the drive shaft 106 is transferred to the hub R.

Figure 4:
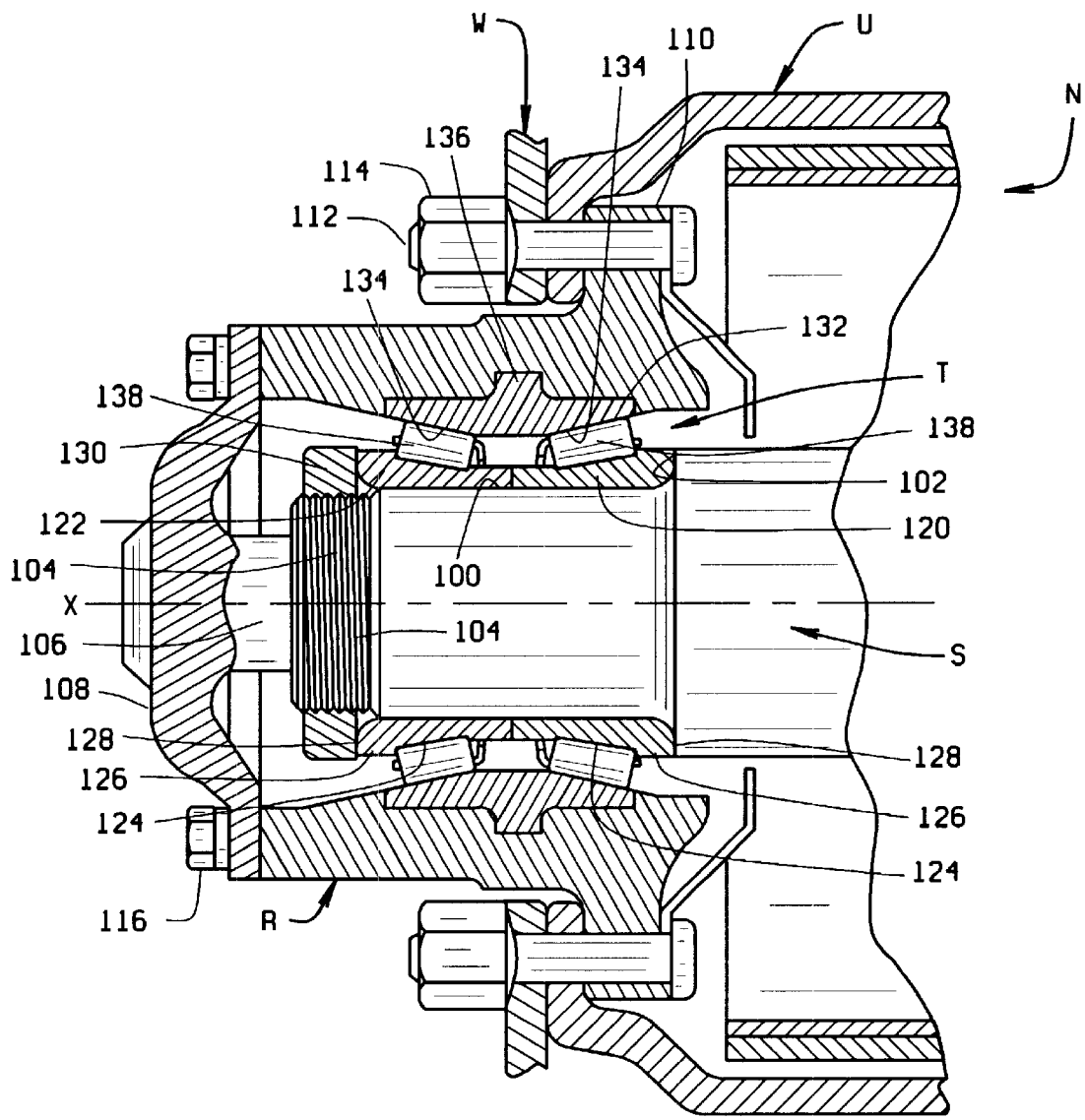
FIG. 4 is an axial sectional view of another wheel mounting of the present invention in which the outer race of its bearing is embedded in a rotating hub.

The bearing T includes (FIG. 4) an inboard cone 120 and an outboard cone 122 both fitted over the bearing seat 100 of the axle S either with a slip fit or an interference fit. Each has tapered raceway 124, a thrust rib 126 at the large end of the raceway 124, and a back face 128 on the end of the thrust rib 126. The back face 128 of the inboard cone 120 is presented inwardly and fits against the shoulder 102 on the axle S, while the back face 128 of the outboard cone 122 is presented outwardly at the threaded end 104 of the axle S. The two cones 120 and 122 are secured on the bearing seat 100 of the axle S with a nut 130 which engages the threads on the threaded end 104 and is turned down against the back face 128 of the outboard cone 122. Thus, the two cones 120 and 122 are clamped between the shoulder 102 and the nut 130.

The bearing T also includes an outer race in the form of an insert 132 which is embedded in the hub R. Indeed, the hub R, which is formed from cast iron, cast steel or some other cast metal such as aluminum, is cast around the insert 132 which is formed from a high grade bearing steel. The insert 132 has two tapered raceways 134 which are presented inwardly toward the axis X with one raceway 134 surrounding the raceway 124 on the inboard cone 120 and the other raceway 134 surrounding the raceway 124 of the outboard cone 122. The raceway 134 tapers downwardly toward each other so that their small diameter ends are presented toward the mid-portion of the insert 132. On its exterior, the insert 132 has a protrusion 136 which establishes a mechanical interlock between the insert 132 and the cast hub R.

Finally, the bearing T has rolling elements in the form of tapered rollers 138 which are arranged in two rows between the raceways 124 on the cones 120 and 122 and the raceways 134 on the insert 132, there being a single row around each cone 120 and 122.

The bearing T confines the hub R both radially and axially on the axle S, yet allows the hub R to rotate about the axis X with minimal torque. Since the outer race of the bearing T, that is the insert 132, is embedded in the hub R, the hub R need not be machined to accommodate bearing races. Moreover, it may have a smaller cross section.

What is claimed is:

1. A mounting for enabling the road wheel of a vehicle to rotate about an axis, said mounting comprising: a hub to which a road wheel may be attached, the hub having a spindle, the axis of which coincides with the axis of rotation; a suspension system component located around the spindle of the hub, which component is a unitary casting formed from a metal; and a bearing interposed between the spindle of the hub and the suspension system component, the bearing including an inner race located around the spindle and having a raceway presented outwardly away from the axis, an outer race embedded within the suspension system component as an insert around which the suspension system component is cast, the outer race being mechanically interlocked with the cast suspension system component and having a raceway that is presented inwardly toward the axis and toward the raceway of the inner race, the outer race being directly against the cast suspension system component directly outwardly from its raceway, and rolling elements located between and contacting the raceways of the inner and outer races.

2. A mounting according to claim 1 wherein the outer race of the bearing is formed from a metal, with the metal of the suspension system component being different from the metal of the outer race.

3. A mounting according to claim 2 wherein the metal of the outer race is a bearing-grade steel.

4. A mounting according to claim 3 wherein the metal of the outer race is hardened along the raceway of the outer race.

5. A mounting according to claim 4 wherein the metal of the suspension system component is selected from a group consisting of ductile iron, steel and aluminum.

6. A mounting according to claim 1 wherein the suspension system component has a near vertical axis about which it pivots.

7. A mounting for enabling the road wheel of a vehicle to revolve about an axis of rotation, said mounting comprising: a hub having a spindle located along the axis and a flange projecting outwardly from the spindle for attachment to a road wheel; two inner raceways carried by the spindle and presented away from the axis; an outer race having two raceways presented inwardly toward the axis and surrounding the inner raceways, whereby the raceways are arranged in pairs, there being within each pair an inner raceway and an outer raceway; rolling elements located between each pair of inner and outer raceways, the raceways being oblique to the axis and the rolling elements generally conforming to the raceways, all such that the rolling elements transfer radial loads as well as thrust loads in both directions between the inner and outer raceways, and a unitary suspension system component formed from a metal cast around the outer race and contacting the outer race directly outwardly from the raceways on the outer race, all such that the outer race is embedded in and mechanically interlocked with the component, the outer race being formed from a bearing grade steel.

8. A mounting according to claim 7 wherein the metal of the outer race is hardened along its raceways.

9. A mounting according to claim 8 wherein the metal of the outer race is hardened by induction hardening.

10. A mounting according to claim 7 wherein the outer race is mechanically interlocked with the component such that the outer race cannot be displaced axially or rotated with respect to the component.

11. A mounting according to claim 10 wherein the outer race has a protrusion that is directed radially outwardly into the cast component.

12. A mounting according to claim 8 wherein the raceways are tapered and the rolling elements are tapered rollers.

13. A mounting according to claim 8 wherein the suspension system component has arms provided with sockets that lie along a near vertical axis.

14. A structure comprising: a steering knuckle that is cast from a first metal and has arms and an intermediate portion located between the arms where it surrounds an axis of rotation; and an outer bearing race that is formed from a second metal around which the first metal is cast such that the bearing race is embedded in the intermediate portion of the knuckle and the cast metal of the intermediate portion captures the race in the knuckle and retains it in place, the race being configured such that a mechanical interlock exits between the race and the intermediate portion and having raceways that are presented inwardly toward the axis, the first metal of the steering knuckle contacting the outer bearing race directly outwardly from the raceways on the race, the second metal being a bearing grade steel that is different from the first metal.

15. A structure according to claim 14 wherein the second metal is hardened along the raceways.

16. A structure according to claim 14 wherein the knuckle contains sockets which lie along a near vertical axis about which the knuckle is capable of pivoting.

17. A structure according to claim 14 wherein the outer race is configured to interlock mechanically with the intermediate portion of the nuckle such that it cannot rotate or be displaced axially in the intermediate portion.

18. A mounting for enabling a road wheel of a vehicle to rotate about an axis, said mounting comprising: a first member in the form of a hub to which the road wheel may be attached; a second member in the form of a suspension system component; and an antifriction bearing located between the first and second members for accommodating relative rotation between the members, the bearing including an inner race formed from bearing grade steel and having a raceway that is presented outwardly away from the axis, an outer race formed from bearing grade steel and having a raceway that is presented inwardly toward the axis and toward the raceway of the inner race, and rolling elements arranged in a row between and contacting the raceways of the inner and outer races, one of the members having the inner race fitted to it, the other of the members being formed from a metal different from the metal of the races and having the outer race embedded in and mechanically interlocked with it as an insert, all as a consequence of the metal of the other member having been cast around the insert and being against the metal of the insert directly outwardly from the raceway on the insert.

19. A mounting according to claim 18 wherein the second member has the insert embedded in it.

20. A mounting according to claim 18 wherein the first member has the insert embedded in it.

21. A mounting according to claim 20 wherein the second member is an axle.

* * * * *